UNITED STATES PATENT OFFICE.

CHARLES W. HARVEY, OF BUFFALO, NEW YORK.

IMPROVED PROCESS OF REDUCING REFRACTORY GOLD, SILVER, AND COPPER ORES.

Specification forming part of Letters Patent No. 53,444, dated March 27, 1866.

*To all whom it may concern:*

Be it known that I, CHARLES W. HARVEY, of the city of Buffalo, county of Erie, and State of New York, have discovered a new Process for Reducing Refractory Gold, Silver, and Copper Ores, and all ores containing these precious metals, or either of them, in combination; and I do hereby declare that the following is a full and exact description thereof.

The ore containing these metals, or either of them, is subjected to my process in an ordinary blast-furnace, and for this purpose I put the ore into the furnace in lumps of convenient size—say egg or chestnut size—according to the character of the ore, and properly interlaid with charcoal fuel. With it I add about fifty per cent. of carbonate of lime-soda, muriate of soda, or other alkali as a flux. Slag may also be used as a substitute.

The furnace thus charged is subjected to an intense heat—say from 1,800° Fahrenheit and upward. The heat is continued until the ore is completely fused or melted and runs off in liquid streams. This has the effect to desulphurize and completely separate the metal from the gangue, the metal being obtained in pigs or bars of white metal. The furnace may be kept charged by adding ore, fuel, and flux, as above stated, and the process continued without interruption as long as may be desired. When the pigs or bars of white metal are thus obtained the process is complete, and the metal afterward is subjected to well-known processes for further separation.

If the ore under treatment contains lime or calx-spar in any considerable quantity then it requires less flux than above stated.

By this process the refractory mines heretofore abandoned or passed over may be successfully and profitably worked. They will yield a greater percentage of pure metal when the ores are treated by this process than other mines worked by processes heretofore known.

What I claim as my discovery, and desire to secure by Letters Patent, is—

The reduction of refractory gold, silver, and copper ores in common blast-furnaces to the degree of obtaining pigs or bars of white metal therefrom by combining and smelting therewith either the carbonate of lime-soda, muriate of soda, or other alkali, or slag, substantially as described.

CHAS. W. HARVEY.

Witnesses:
GEO. W. WALLACE,
E. B. FORBUSH.